(12) United States Patent
Puthenpura et al.

(10) Patent No.: US 8,595,374 B2
(45) Date of Patent: Nov. 26, 2013

(54) METHOD AND APPARATUS FOR CAPACITY DIMENSIONING IN A COMMUNICATION NETWORK

(75) Inventors: Sarat Puthenpura, Berkeley Heights, NJ (US); Stuart Blackburn, San Ramon, CA (US); Dipak Ghosal, El Cerrito, CA (US); Gopalakrishnan Meempat, East Brunswick, NJ (US); Ravi Raina, North Brunswick, NJ (US); Raghvendra Savoor, Walnut Creek, CA (US); Vishwanath Ramamurthi, Fremont, CA (US); Huahui Wang, East Hanover, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 378 days.

(21) Appl. No.: 12/963,369

(22) Filed: Dec. 8, 2010

(65) Prior Publication Data

US 2012/0151078 A1 Jun. 14, 2012

(51) Int. Cl.
*G06F 15/16* (2006.01)
(52) U.S. Cl.
USPC .......................... 709/231; 370/252; 370/230
(58) Field of Classification Search
None
See application file for complete search history.

(56) References Cited

U.S. PATENT DOCUMENTS

| | | | |
|---|---|---|---|
| 6,266,322 B1 * | 7/2001 | Berger et al. | 370/229 |
| 6,788,646 B1 * | 9/2004 | Fodor et al. | 370/230 |
| 6,795,399 B1 * | 9/2004 | Benmohamed et al. | 370/235 |
| 7,076,552 B2 * | 7/2006 | Mandato | 709/226 |
| 7,225,267 B2 * | 5/2007 | Key et al. | 709/235 |
| 7,746,806 B2 * | 6/2010 | Racz et al. | 370/252 |
| 7,796,514 B2 * | 9/2010 | Noriega | 370/230 |
| 7,864,802 B1 * | 1/2011 | Dehkordi et al. | 370/468 |
| 7,944,839 B2 * | 5/2011 | Siris | 370/236 |
| 8,014,280 B2 * | 9/2011 | Zhang et al. | 370/230 |
| 8,179,800 B1 * | 5/2012 | Gunduzhan | 370/235 |
| 8,280,994 B2 * | 10/2012 | Blouin et al. | 709/223 |
| 8,289,851 B2 * | 10/2012 | Lakshman et al. | 370/235 |
| 8,300,575 B2 * | 10/2012 | Willars | 370/328 |
| 8,406,129 B2 * | 3/2013 | Belanger et al. | 370/230 |
| 2003/0069963 A1 * | 4/2003 | Jayant et al. | 709/224 |
| 2004/0010592 A1 * | 1/2004 | Carver et al. | 709/226 |
| 2007/0104100 A1 * | 5/2007 | Davey et al. | 370/230 |
| 2010/0153555 A1 * | 6/2010 | Majmundar et al. | 709/226 |
| 2010/0269044 A1 * | 10/2010 | Ivanyi et al. | 715/736 |
| 2011/0149761 A1 * | 6/2011 | Belanger et al. | 370/252 |
| 2012/0281536 A1 * | 11/2012 | Gell et al. | 370/235 |
| 2012/0327779 A1 * | 12/2012 | Gell et al. | 370/238 |

OTHER PUBLICATIONS

T. Bonald et al. "On Performance Bounds for the Integration of Elastic and Adaptive Streaming Flows," *SIGMETRICS/Performance '04*, Jun. 12-16, 2004, New York, NY, consists of 11 unnumbered pages.
U.S. Appl. No. 12/655,236, filed Dec. 23, 2009, "Technique for Determining Transport Capacity Required to Achieve Controllable Worst Case Throughput," pp. 1-15.

* cited by examiner

*Primary Examiner* — Greg C Bengzon

(57) ABSTRACT

A method, computer readable medium and apparatus for calculating a capacity for high speed packet access data in a link in a communications network are disclosed. For example, the method initializes parameters associated with streaming data, long elastic data and short elastic data, determines, via a processor, a capacity value such that a quality of service metric is met for the streaming data, the long elastic data and the short elastic data and provisions the link with the capacity value if the quality of service metric is met.

20 Claims, 10 Drawing Sheets

METHOD AND APPARATUS FOR CAPACITY DIMENSIONING IN A COMMUNICATION NETWORK

BACKGROUND

Packet based video is one of the fastest growing internet applications. At a high level, video streaming services, as well as any other similar streaming service with real-time near-deterministic and timely delivery requirements, employing Internet protocol (IP) can be classified into two categories: video over IP networks and video over the Internet. In the case of video over IP networks, video is delivered using dedicated IP networks. The availability of dedicated network allows the actuation of various admission control and traffic prioritization policies at the routers and switches to provide higher priority to video and other real-time traffic and, thereby protecting the more stringent quality of service (QoS) requirements of video.

Video over the Internet, on the other hand, uses public Internet infrastructures to deliver streaming video. This is also referred to as video-over-the-top and is growing rapidly. However, video over the Internet is carried just like any other data that is carried via hypertext transfer protocol (HTTP) using transmission control protocol (TCP). As a result, an insufficient amount of bandwidth on various links may be available, thereby causing the QoS requirements of the video to not be met.

SUMMARY

In one embodiment, the present disclosure teaches a method, computer readable medium and apparatus for calculating a capacity for high speed packet access data in a link in a communications network. In one embodiment, the method comprises initializing parameters associated with streaming data, long elastic data and short elastic data, determining, via a processor, a capacity value such that a quality of service metric is met for the streaming data, the long elastic data and the short elastic data and provisioning the link with the capacity value if the quality of service metric is met

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
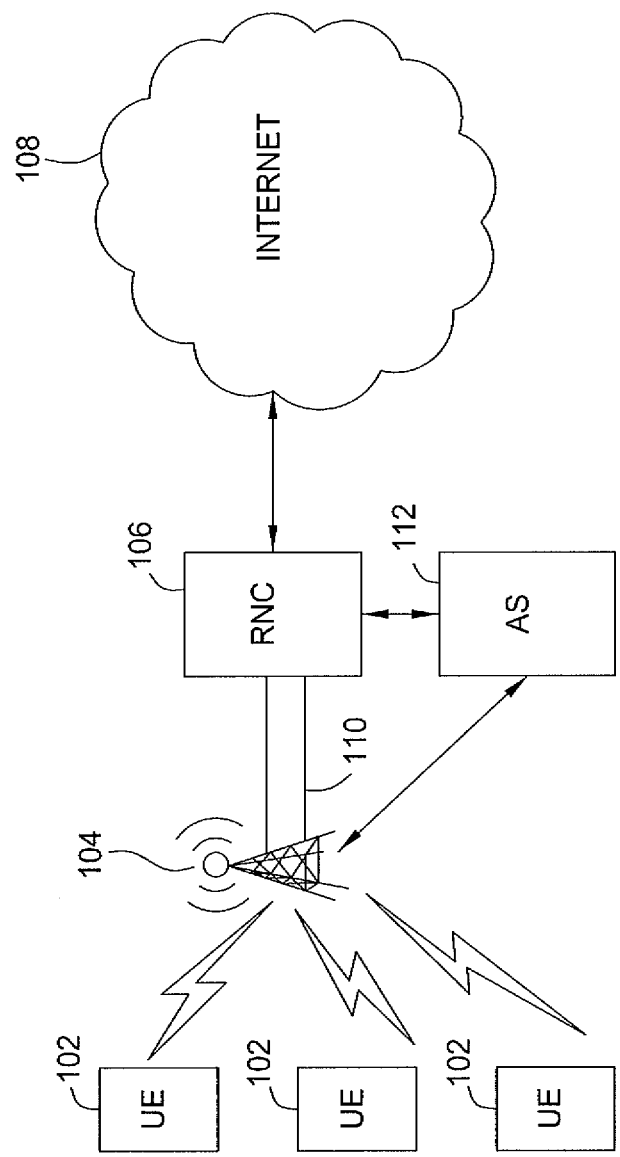
FIG. 1 illustrates one example of a communications network architecture.

The present disclosure broadly discloses a method, computer readable medium and an apparatus for calculating a capacity for high speed packet access data in a link in a communications network. In one embodiment, the link of particular interest may be an access link that connects a wireless base station (e.g., in 3G or 4G wireless networks) to a radio access network (RAN), e.g., an IuB link in 3G or an SIu link in LTE. FIG. 1 is a block diagram depicting one example of a communications network architecture 100 related to the current disclosure. In one embodiment, the communications network architecture 100 comprises a 3G or a 4G cellular network such as a universal mobile telecommunications system (UMTS) network, a long term evolution (LTE) network and the like. However, it should be noted that the communications network architecture 100 may include other types of communications networks such as general packet radio services (GPRS) networks, global system for mobile communication (GSM) networks or enhanced data rates for GSM evolution (EDGE) networks, and the like, by substituting the appropriate hardware and/or hardware configurations for the respective networks.

FIG. 1 is a block diagram depicting one example of a communications network architecture 100 related to the current disclosure. In one embodiment, the communications network architecture 100 includes one or more user endpoints or user equipment (UE) 102, a base station 104, a radio network controller (RNC) 106, the Internet 108 and an application server (AS) 112.

In one embodiment, the user endpoints 102 may be any type of user device, such as for example, a mobile telephone, a smart phone, a messaging device, a tablet computer, a laptop computer, an air card and the like. The user endpoint 102 may communicate wirelessly with elements of the communications network architecture 100.

In one embodiment, the base station 104 may be an eNodeB. In one embodiment, the RNC 106 provides features such as packet scheduling, radio resource control (RRC) and handover. In one embodiment, the AS 112 may include a processor and memory as described in FIG. 10 below and may be used to perform the modeling techniques discussed below. In one embodiment, the RNC 106 and the AS 112 may be part of a core network of the communication network architecture 100.

The communications network architecture 100 may also include additional hardware or network components that are not illustrated depending on the type of network. For example, if the communications network is a UMTS network, the communications network architecture 100 may also include a serving general packet radio services (GPRS) support node (SGSN), a gateway GPRS support node (GGSN) and the like. If the communications network is an LTE network, the communications network architecture 100 may also include mobile management entity (MME), a serving gateway (SGW), a home subscriber server (HSS), a policy and charging rules function (PCRF), a packet data network (PDN) gateway (PGW) and the like. In other words, FIG. 1 only illustrates a simplified communications network architecture 100 and should not be interpreted as a limitation of the present disclosure.

In one embodiment, data flows from the user endpoint device 102 via various links in the communications network architecture 100 to send or receive data to and from various destinations or sources via the Internet 108. For example, FIG. 1 illustrates a link 110 between the base station 104 and the RNC 106. In one embodiment, the link 110 may be an IuB interface of an UMTS communications network or an Stu link in an LTE communications network. However, the link 110 may be any link or interface of any type of communications network.

It is important for service providers today to accurately engineer the links, e.g., the link 110, in the communications network architecture 100 to have sufficient, yet optimal, capacity to handle the traffic flowing through each link. For example, various types of data may have quality of service (QoS) requirements that must be met based upon contractual agreements with the subscriber.

Figure 2:
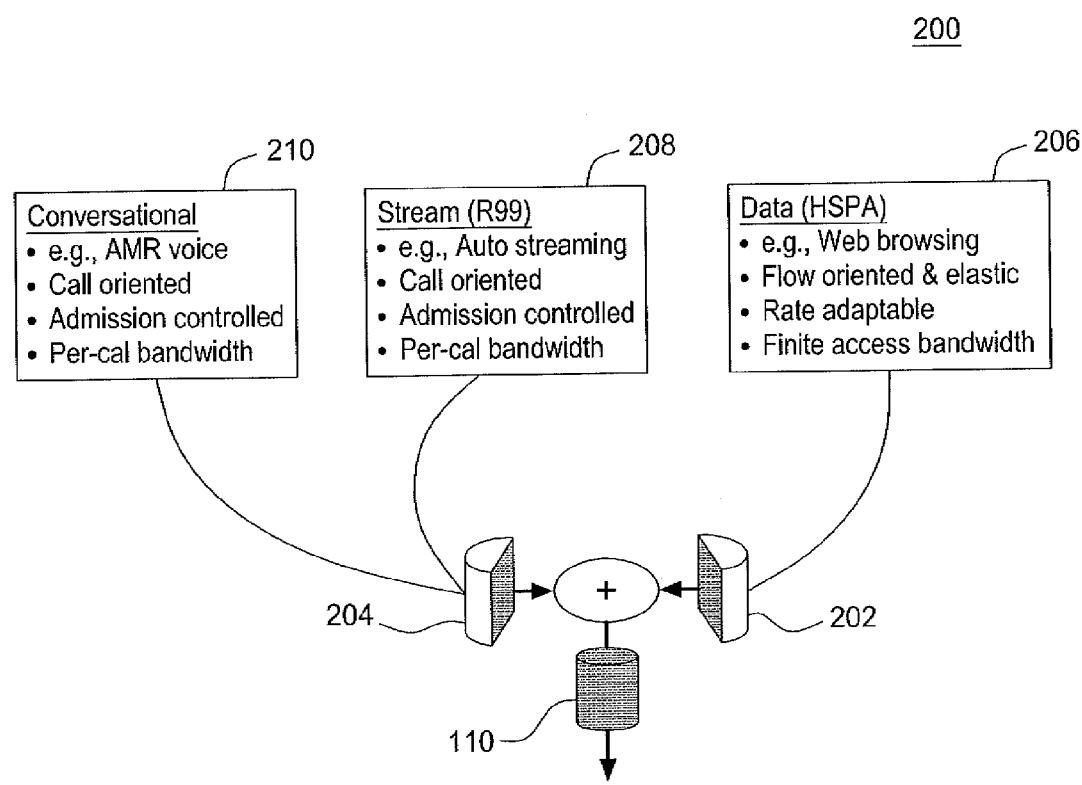
FIG. 2 illustrates a block diagram of a data architecture within a link of the communications network.

FIG. 2 illustrates a block diagram of a data architecture 200 within the link 110. In one embodiment, the data flowing through the link 110 may be divided into different types of data. A first portion 204 of the link 110 may include conversational data 210 (e.g., voice, call oriented data, admission controlled data, per-call bandwidth data and the like) and stream (R99) data 208 (e.g., audio streaming, call oriented data, admission controlled data, per-call bandwidth data, and the like). The capacity for the link 110 to handle conversational data 210 and the stream (R99) 208 data may use one type of modeling, such as for example, a Kaufman-Roberts dimensional modeling method.

A second portion 202 of the link 110 may include high speed packet access (HSPA) data 206 (or any other broadband data) that uses transmission control protocol (TCP). HSPA data 206 may include, e.g., web browsing data, flow oriented and elastic data, rate adaptable data, finite access bandwidth data and the like. Previously, dimensioning models used for HSPA data 206 (and other similar wideband data) lumped all the data as a single type of data, i.e., elastic data.

Elastic data may be defined as a data type that is bit conserving (i.e., it sends all of the data), but where the time for transmission may change depending on the available bandwidth. In other words, there is no time conservation for elastic data and the transmission duration can change.

However, previous dimensioning models for HSPA data 206 that lumped all of the data as a single type of elastic data are no longer accurate for the second portion 202 of the link 110 carrying the HSPA data 206, in its entirety. Currently, streaming data (e.g., video over the Internet) is becoming a substantial portion of the HSPA data traffic that flows through the link 110. As discussed above, HSPA streaming data is not the same as the streaming data such as the conversational data 210 or the stream (R99) data 208 discussed above. In addition, the HSPA streaming data should not be confused with streaming data that is transmitted via dedicated IP networks. Rather, the streaming data that is part of the HSPA data 206 is transmitted via TCP.

In one embodiment, streaming data may be defined as time conserving, but not bit conserving. For example, if there is congestion, bits may be dropped (or coding rate reduced at the server) and a downgraded quality of the streaming data may be transmitted. In other words, the duration of the streaming data does not change. For example, if a video is five minutes long, the duration of the transmission will be five minutes.

In addition to streaming video, the present disclosure also pertains to an elastic data traffic class (i.e., the non-stream portion of the HSPA data 206) that competes against streaming video for bandwidth at various network resources. At a finer granularity, the elastic data sessions are in turn comprised of long elastic sessions (e.g., large file transfer sessions and the like) and short elastic sessions (e.g., email sessions, web surfing sessions and the like) that employ TCP. In the remainder of this disclosure, the former may be abbreviated as long elastic data and the latter as short elastic data.

Notably, streaming data, long elastic data and short elastic data have unique behavioral attributes and different performance criteria. Therefore, the previously used dimensioning techniques to calculate a required capacity for the link 110 may no longer be accurate.

In one embodiment, the present disclosure provides a new dimensioning technique to calculate a required capacity for the second portion 202 of the link 110 that takes into consideration the different types of HSPA data 206 (e.g., streaming data, long elastic data and short elastic data). In one embodiment, the new dimensioning technique may be applied as part of a process that can be performed by the AS 112 or a general purpose computer as disclosed in FIG. 10.

Figure 3:
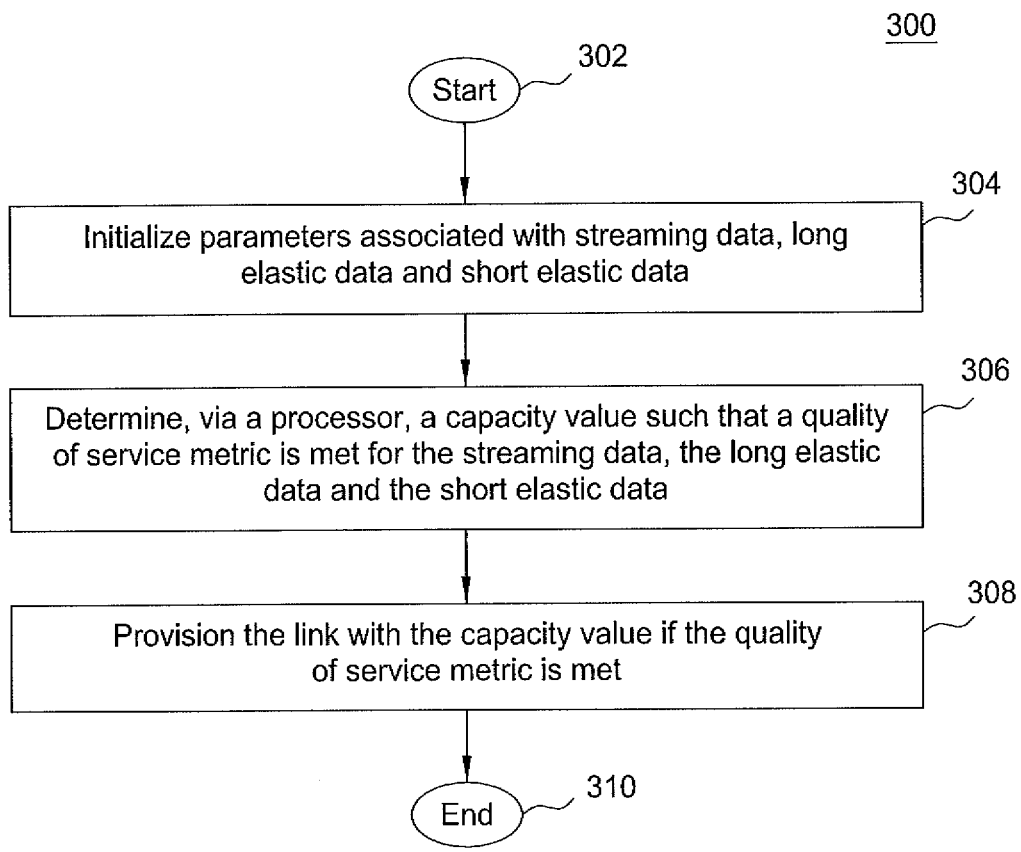
FIG. 3 illustrates a high level flowchart of one embodiment of a method for calculating a capacity for high speed packet access data in a link in a communications network.

FIG. 3 illustrates a high level flowchart of a method 300 for one embodiment of calculating a capacity for HSPA data in a link in a communications network. In one embodiment, the method 300 may be implemented by the AS 112 or a general purpose computer having a processor, a memory and input/output devices as discussed below with reference to FIG. 10.

The method 300 begins at step 302 and proceeds to step 304. At step 304, the method 300 initializes parameters associated with streaming data, long elastic data and short elastic data. The specific parameters are discussed below with reference to FIGS. 4-9.

At step 306, the method 300 determines, via a processor, a capacity value such that a QoS metric is met for the streaming data, the long elastic data and the short elastic data. In one embodiment, the determining step may be an iterative process. For example, one of the initial parameters may be an initial capacity value. Based upon the initial capacity value, it may be determined if the QoS metric is met for the streaming data, the long elastic data and the short elastic data. If not, the initial capacity value may be revised higher and the determining step may be repeated until the QoS metric is met.

At step 308, the method 300 provisions the link with the capacity value if the quality of service metric is met. In other words, the capacity value is the appropriate allocation that meets the quality of service metrics. The method 300 ends at step 310.

Figure 4:
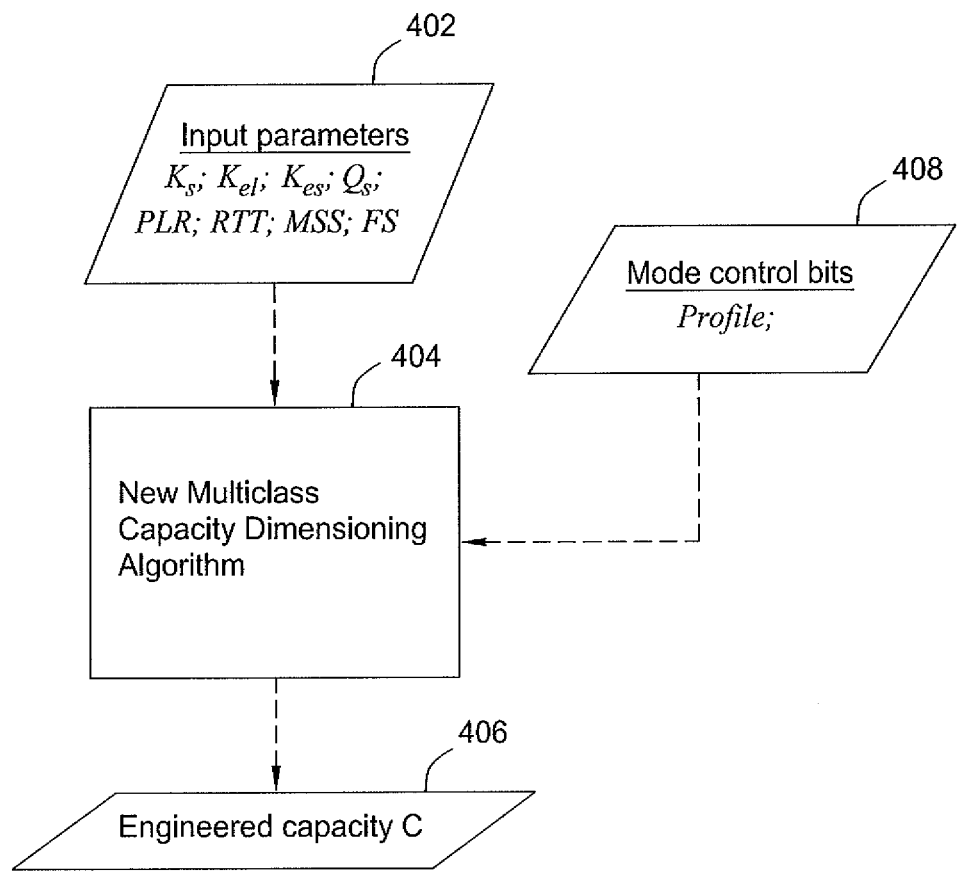
FIG. 4 illustrates another high level flowchart of one embodiment of a method for calculating a capacity for high speed packet access data in a link in a communications network.

FIG. 4 illustrates a high level flowchart of a method 400 of another embodiment for calculating a capacity for high speed packet access data in a link in a communications network. In one embodiment, the method 400 may be implemented by the AS 112 or a general purpose computer having a processor, a memory and input/output devices as discussed below with reference to FIG. 10.

The method 400 begins at step 402 where the method 400 is initialized with various input parameters. In one embodiment, the input parameters may include an aggregate busy hour data traffic intensity for the streaming data ($K_s$), an aggregate busy hour data traffic intensity for the long elastic data ($K_{el}$), an aggregate busy hour data traffic intensity for the short elastic data ($K_{es}$), a peak rate of the streaming data ($Q_s$), a packet loss probability for the elastic data (e.g., the long elastic data and the short elastic data) (PLR), a round trip delay time for the elastic data (e.g., the long elastic data and the short elastic data) (RTT), a maximum transmission control protocol segment size (MSS) and a representative file size for the short elastic data (FS).

In one embodiment, the $Q_s$ is dictated by the application drain rate of the streaming data. In other words, $Q_s$ is a known fixed value based upon documented attributes of the streaming applications.

At step 404, the method 400 enters the input parameters from step 402 into the new multi-class capacity dimensioning algorithm. At step 406, the method 400 determines a capacity value (C) that is used to engineer the capacity of a link, e.g., the link 110. In one embodiment, the method 400 may be executed based upon one or more different bandwidth sharing profiles 408 among contending applications. Thus, depending on the sharing profile that is used, the computed outcome for C may vary between profiles.

In one embodiment, two different types of sharing profiles may be used. A first profile applies an even splitting of capacity among active sessions. For example, in a two dimensional model of $x_s$ stream sessions and $x_e$ elastic sessions, there may be no distinction among the long and short elastic sessions. In one embodiment, the first profile may be represented as shown below in Equation (1):

$$\gamma_s(x_s, x_e) = \gamma_e(x_s, x_e) = \frac{1}{x_s + x_e}, \quad \text{Eq. (1)}$$

where $\gamma_s$ represents a share of the capacity assigned to each of the $x_s$ streaming data sessions and $\gamma_e$ represents a share of the capacity assigned to each of the $x_e$ elastic data sessions.

For a scenario with more than two classes (e.g., a 3-class scenario comprised of streaming data, long elastic data and short elastic data), the share of bandwidth captured by each active session belonging to class i, $\gamma_i(x)$, is given by Equation (2):

$$\gamma_i(x) = \text{Min}\left\{\alpha_i, \frac{1 - \sum_{j=1}^{i-1} x_j \gamma_j(x)}{\sum_{j=i}^{N} x_j}\right\}, \quad \text{Eq. (2)}$$

with the convention that the result of any summation where the upper index is less than the lower index equals zero.

A second profile applies a peak rate proportional bandwidth sharing profile. For example in a two dimensional model of $x_s$ stream sessions and $x_e$ elastic sessions, the second profile may be represented as shown below in Equations (3) and (4):

$$\gamma_s(x_s, x_e) = \frac{\alpha_s}{\alpha_s x_s + \alpha_e x_e}, \quad \text{Eq. (3)}$$

$$\gamma_e(x_s, x_e) = \frac{\alpha_e}{\alpha_s x_s + \alpha_e x_e}, \quad \text{Eq. (4)}$$

where $\alpha_s$ represents a normalized peak rate to pipe capacity for the streaming data and $\alpha_e$ represents a normalized peak rate to pipe capacity for the elastic data.

The $\alpha_s$ and the $\alpha_e$ may be calculated by Equations (5) and (6):

$$\alpha_s = \frac{Q_s}{C}, \quad \text{Eq. (5)}$$

$$\alpha_e = \frac{Q_e}{C}, \quad \text{Eq. (6)}$$

where $Q_s$ represents the peak rate of the streaming data, $Q_e$ represents the peak rate of the elastic data and C represents the target capacity of the link, which is being evaluated for QoS compliance in the current instance of the dimensioning process. The value of $Q_s$ is determined based upon the type of streaming data, as discussed above.

The value of $Q_e$ may be calculated depending on the type of elastic data. For example, a peak rate of the long elastic data $Q_{el}$ and a peak rate of the short elastic data $Q_{es}$ may be calculated. The values for $Q_{el}$ and $Q_{es}$ may be calculated by considering the behavior of the long elastic and short elastic data under different PLR and RTT. In one embodiment, Equations (7) and (8) below can be used:

$$Q_{el} = \frac{1.22 \cdot MSS}{RTT \cdot \sqrt{PLR}}, \quad \text{Eq. (7)}$$

$$Q_{es} = \frac{FS}{RTT \cdot \log_2(FS/MSS)}, \quad \text{Eq. (8)}$$

where the variables, FS, MSS, RTT and PLR are known input parameters, as discussed above.

As a result, using the $Q_{el}$ and the $Q_{es}$, the $\alpha_e$ may be further categorized into the normalized peak rate for the long elastic data $\alpha_{el}$ and the normalized peak rate for the short elastic data $\alpha_{es}$. The values for $\alpha_{el}$ and $\alpha_{es}$ are provided below by Equations (9) and (10):

$$\alpha_{el} = \frac{Q_{el}}{C}, \quad \text{Eq. (9)}$$

$$\alpha_{es} = \frac{Q_{es}}{C}, \quad \text{Eq. (10)}$$

For a scenario with more than two classes (e.g., a 3-class scenario comprised of streaming data, long elastic data and short elastic data), the share of bandwidth captured by each active session belonging to class i, $\gamma_i(x)$, is given by Equation (11):

$$\gamma_i(x) = \frac{\alpha_i}{\text{Max}\left\{1, \sum_{j=1}^{N} \alpha_j x_j\right\}}, \quad \text{Eq. (11)}$$

Figure 5:
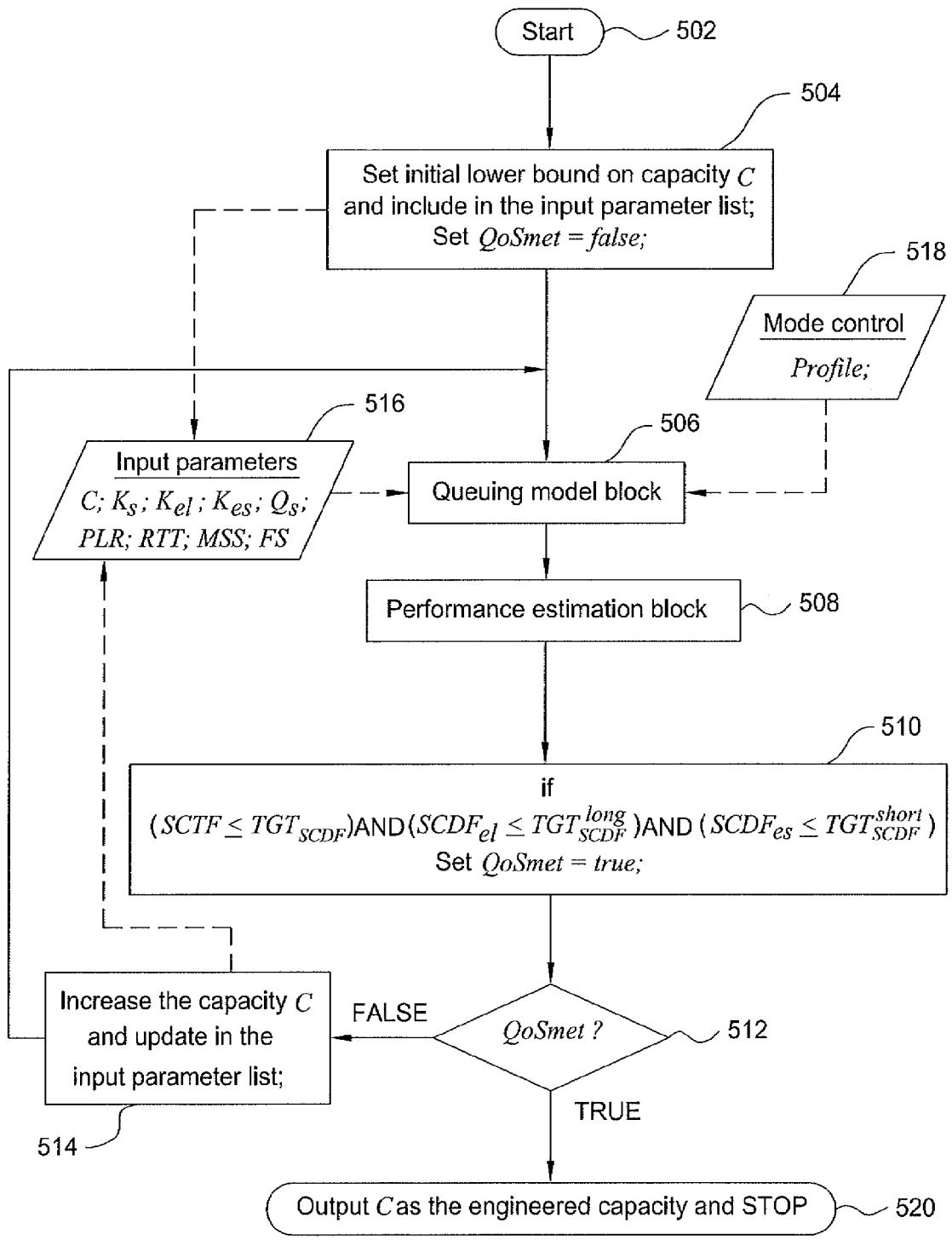
FIG. 5 illustrates a more detailed flowchart of one embodiment of a method for calculating a capacity for high speed packet access data in a link in a communications network.

FIG. 5 illustrates a more detailed flowchart of one embodiment of a method 500 for calculating a capacity for high speed multi-class access packet data in a link in a communications network. FIG. 5 provides more detail to some of the steps illustrated in FIG. 4. In one embodiment, the method 500 may be implemented by the AS 112 or a general purpose computer having a processor, a memory and input/output devices as discussed below with reference to FIG. 10.

The method 500 begins at step 502 and proceeds to step 504. At step 504 an initial lower bound on the capacity, C, is set and included in the input parameter list 516. In addition, at step 504, the method 500 sets a variable QoSmet=false.

The method 500 then proceeds to step 506, where the input parameters from block 516 and a bandwidth sharing profile from block 518 are fed into a queuing model block 506. In one embodiment, the input parameters may include, C, $K_s$, $K_{el}$, $K_{es}$, $Q_s$, PLR, RTT, MSS and FS. In one embodiment, the profile may be one of a plurality of different types of sharing profiles. For example, two possible sharing profiles may be an equal sharing profile or a proportional sharing profile. The equations for the two types of sharing profiles are provided by Equations (1)-(4) and (11) above.

At a high level, the queuing model block 506 determines the computational priority ordering of the streaming data, the long elastic data and the short elastic data, and sets the bounds of a three dimensional state transition diagram. It should be noted that if the long elastic data and the short elastic data are lumped together as a single elastic data class, the state transition diagram may be simplified into a two dimensional state transition diagram.

Attempting to solve the steady state probabilities of the three dimensional state transition diagram and then attempting to estimate from the probabilities performance metrics applicable to each type of data traffic (e.g., the streaming data, the long elastic data and the short elastic data) can be a daunting task. For example, solving the steady state probabilities of the three dimensional state transition diagram would require solving a system of linear equations in $K^3$ variables, having a complexity of approximately $K^6$.

As a result, in one embodiment the queuing model block 506 attempts to perform conservative bounding of the state transition diagrams for various performance metrics, for example, sub-par customer time fraction (SCTF) for the streaming data and a sub-par customer data fraction (SCDF) for the elastic data. In one embodiment, the SCDF may be further divided into a long elastic data sub-par customer data fraction ($SCDF_{el}$) and a short elastic data sub-par customer data fraction ($SCDF_{es}$). Additionally, the SCTF can be mapped to an objective streaming video quality metric, such as for example, the probability of stall or the Peak Signal to Noise Ratio (PSNR). These performance metrics are discussed in further detail below.

For simplicity, the illustrative examples and equations below are provided for a two-dimensional state transition diagram. However, the equations may easily be modified for the three-dimensional state transition diagram (or any arbitrary N-dimensional state transition diagram). For example, expressions with "e" may be substituted with "(el+es)". The conservative bounding may be determined by calculating a pessimistic weight function $\check{\Psi}(x_s, x_e)$ for each state $(x_s, x_e)$. The technique involves following a so-called heaviest weight path along the edges of the state space (e.g., a square for 2-D and a cube for 3-D). Some of the theoretical underpinnings for performing this technique may be found in a document entitled "On Performance Bounds for the Integration of Elastic and Adaptive Streaming Flows," T. Bonald and A. Proutiere, *SIGMETRICS/Performance* '04, June 2004, New York, which is incorporated by reference in its entirety. Alternatively, an optimistic weight function $\hat{\Psi}(x_s, x_e)$ for each state $(x_s, x_e)$ that follows the lightest weight path along the edges of the state space may also be used to arrive at optimistic estimates for the performance metrics.

In one embodiment, the pessimistic weight function $\check{\Psi}(x_s, x_e)$ and the optimistic weight function $\hat{\Psi}(x_s, x_e)$ may be calculated by first ordering the classes of sessions. For a given state of a system $(x_1, x_2)$, denote the departure rate of class i sessions (i=1,2) by $\phi_i(x_1, x_2)$, i=1, 2.

To exemplify the notion of departure rates in a two-class system comprised of stream $(x_1)$ an elastic $(x_2)$, if the average duration of each streaming session is denoted by $1/\mu_s$ (wherein $\mu_s$ represents an inverse of the streaming session duration), then the total rate at which stream sessions are departing the system when there are $x_1$ active stream sessions equals $\phi_1(x_1, x_2) = x_1 \mu_s$. Note in particular that $\phi_1(x_1, x_2)$ is independent of the number of elastic sessions $x_2$. This is reflective of the fact that stream sessions are time conserving as described earlier and last for fixed durations, independent of the congestion levels (while they are non-bit conserving). Now, suppose the average duration of an elastic session, if the entire capacity of the link were to be at its disposal, is denoted by $1/\mu_e$ (wherein $\mu_e$ represents an inverse of the elastic session duration). Then the rate at which elastic sessions are departing the system when there are $x_1$ stream sessions and $x_2$ elastic sessions would be equal to $\phi_2(x_1, x_2) = x_2 \mu_e \times \gamma_e(x_1, x_2)$, where $\gamma_e(x_1, x_2)$ is the profile-dependent bandwidth share available to each elastic session given by Equations 1-4 and Equation 11. The fact that $\phi_2(x_1, x_2)$ depends on both the stream and elastic occupancies (i.e., $x_1$ and $x_2$) ensues from the fact that, unlike stream traffic, elastic traffic is bit conserving but not time conserving. In other words, the duration of an elastic session stretches or shrinks depending on the congestion level, till the last bit is successfully transmitted.

Apart from the above definitions for the average stream session duration $1/\mu_s$ and elastic session duration subject to full capacity availability $1/\mu_e$ ($1/\mu_{el}$ for long elastic and $1/\mu_{es}$ for short elastic in a 3-class model), we also define the mean stream session arrival rate $\lambda_s$ and elastic session arrival rate $\lambda_e$ ($\lambda_{el}$ for long elastic and $\lambda_{es}$ for short elastic in a 3-class model). In terms of these parameters, we define the normalized stream session Erlangs $\rho_s = \lambda_s / \mu_s$ and the normalized elastic session erlangs $\rho_e = \lambda_e / \mu_e$ ($\rho_{el} = \lambda_{el} / \mu_{el}$ for long elastic and $\rho_{es} = \lambda_{es} / \mu_{es}$ for short elastic in a 3-class model). While the $\rho$ parameters are necessary for the computational sequence to be described, estimates for the arrival rates $\lambda$ and average inverse durations $\mu$ are typically not available. However, as shown later, the $\rho$ parameters are alternately calculated in terms of the known aggregate busy hour traffic intensities or volumes $\{K_s, K_{el}, K_{es}\}$ and peak rates $\{Q_s, Q_{el}, Q_{es}\}$.

With the concept of departure rates well defined, let the classes be ordered such that:

$$\frac{\varphi_1(x_1, x_2 - 1)}{\varphi_1(x_1, x_2)} \leq \frac{\varphi_2(x_1 - 1, x_2)}{\varphi_2(x_1, x_2)}, \quad \text{Eq. (12)}$$

$$\forall x_1, x_2 : x_1 > 0, x_2 > 0,$$

Given the ordered classes, the pessimistic and optimistic weight functions are given by Equations (13) and (14) below:

$$\check{\Psi}(x_1, x_2) = \frac{\lambda_1^{x_1} \lambda_2^{x_2}}{\prod_{i=1}^{x_2} \varphi_2(x_2, i) \prod_{i=1}^{x_1} \varphi_1(i, 0)}, \quad \text{Eq. (13)}$$

$$\hat{\Psi}(x_1, x_2) = \frac{\lambda_1^{x_1} \lambda_2^{x_2}}{\prod_{i=1}^{x_1} \varphi_1(i, x_2) \prod_{i=1}^{x_2} \varphi_2(0, i)}, \quad \text{Eq. (14)}$$

wherein $\lambda$'s, as defined earlier, represent mean session arrival rates and $\check{\Psi}(0,0) = \hat{\Psi}(0,0) = 1$. As discussed above, the $\phi$ terms in the denominators of the above equations contain $\mu$ terms, which divide into corresponding $\lambda$ terms in the numerator such that these equations can be restated in terms of terms of $\rho$ terms. While $\lambda$'s and $\mu$'s are typically unavailable, the $\rho$ terms can be calculated alternately from traffic volumes and peak rates as shown later, thus facilitating the computational steps to be described.

Over the remainder of this description, the infinite state-space $\{(0,0) \ldots (\infty, \infty)\}$ is approximated by a finite state-space $\{(0,0) \ldots (K,K)\}$, with K being chosen so as to achieve an acceptable degree of numerical accuracy. Similarly, in the context of a 3-dimensional model, the infinite state-space $\{(0,0,0) \ldots (\infty,\infty,\infty)\}$ will be approximated by the finite state-space $\{(0,0,0) \ldots (K,K,K)\}$.

Note that Equation (13) may be expressed in the following efficient recursive format:

$$\check{\Psi}(0,0) = 1;$$ Eq. (13A)

$$\check{\Psi}(x_1, 0) = \Psi(x_1 - 1, 0) \times \frac{\lambda_1}{\varphi_1(x_1, 0)}, x_1 = 1, \ldots, K$$

$$\check{\Psi}(x_1, x_2) = \Psi(x_1, x_2 - 1) \times \frac{\lambda_2}{\varphi_1(x_1, x_2)}, x_2 = 1, \ldots, K$$

Based on the recursive variant Equation (13A), the following algorithmic sequence may be followed to exhaustively compute the weight functions $\{\check{\Psi}(0,0) \ldots \check{\Psi}(K,K)\}$ for all the system states $\{[0,0] \ldots [K,K]\}$:

```
Set Ψ̌(0,0)=1;
For (i=0 to K) {
    If (i>0) then calculate Ψ̌(0,i) from Equation (13A);
    For (j=1 to K)
        Calculate Ψ̌(j,i) from Equation (13A);
}
```

As may be appreciated, Equation (14) for the optimistic bound can also be expressed in an analogous recursive format with the associated efficient implementation. The recursive formats and associated efficient implementations may be used in the algorithmic descriptions to be given.

In one embodiment, given the pessimistic weight function above in Equation (13), the pessimistic steady state distribution, $\check{\pi}$, for each state, x, may be computed by Equation (15) below:

$$\check{\pi}(x_s, x_e) = \check{\pi}(0,0)\check{\Psi}(x_s, x_e), \text{ where } \check{\pi}(0,0) = 1/\Sigma_{(x_s, x_e)}\check{\Psi}(x_s, x_e),$$ Eq. (15)

Using the calculated pessimistic bounds, the conservative (pessimistic) bounds of the performance metrics SCTF and SCDF can be calculated using Equations (16) and (17) below:

$$SCTF = \frac{\sum_{(x_s, x_e)\gamma_s(x_s, x_e)<SST} x_s \pi(x_s, x_e)}{\sum_{(x_s, x_e)} x_s \pi(x_s, x_e)},$$ Eq. (16)

$$SCDF = \frac{\sum_{(x_s, x_e)\gamma_e(x_s, x_e)<ET} x_s \gamma_e(x_s, x_e) \pi(x_s, x_e)}{\sum_{(x_s, x_e)} x_e \gamma_e(x_s, x_e) \pi(x_s, x_e)},$$ Eq. (17)

where ET represents a customer stipulated data throughput rate acceptability threshold for each elastic session (e.g., 800 kilobytes per second (Kbps)), SST represents a customer stipulated data throughput rate acceptability threshold for each stream session (e.g., 800 Kbps) and $\gamma_e(x_s, x_e)$ is defined by Equation (4) above. In the 3-dimensional model, it should be noted that the ET would have two distinct components, ELT and EST, for long elastic data throughput rate acceptability threshold and short elastic data throughput rate acceptability threshold, respectively, where appropriate.

It should be noted that any of the equations above for two classes may be generalized to an arbitrary number of classes. For example, any of the equations may be generalized for three classes to be applied specifically to a system having the streaming data, the long elastic data and the short elastic data as distinct components.

The method 500 then proceeds to a performance estimation block 508. Based upon the bounds calculated above, the performance metrics such as SCTF, $SCDF_{el}$ and $SCDF_{es}$, may be calculated via equations, such as Equations (16) and (17) above.

The method 500 then proceeds to step 510, where the performance metrics are compared against a target value for each of the performance metrics. For example, there may be a predefined SCTF target value ($TGT_{SCTF}$), a predefined long elastic SCDF target value ($TGT_{SCDF}^{long}$) and a predefined short elastic SCDF target value ($TGT_{SCDF}^{short}$). In one embodiment, the $TGT_{SCTF}$, $TGT_{SCDF}^{long}$ and $TGT_{SCDF}^{short}$ may be configurable values. For example, the $TGT_{SCTF}$ may be set to 0.1%, the $TGT_{SCDF}^{long}$ may be set to 10% and the $TGT_{SCDF}^{short}$ may be set to 1%. The numerical values are only provided as examples and should not be considered limiting. If the each one of the performance metrics, SCTF, $SCDF_{el}$ and $SCDF_{es}$, calculated in step 508 are less than or equal to their respective target values, $TGT_{SCTF}$, $TGT_{SCDF}^{long}$ and $TGT_{SCDF}^{short}$, then the variable QoSmet is set to "true".

At step 512, the method 500 determines whether the QoSmet variable is true or false. If the variable QoSmet is false, then the method 500 proceeds to step 514, where the value of C is updated in the input parameter list 516. In other words, at step 514 the method 500 determined that the initial value of C was not a sufficient amount of capacity for the QoS to be met for each of the different types of traffic depending on the type of sharing profile that was used to perform the calculations. As a result, another iteration of the calculations must be performed with the intent of converging to the optimal value for C.

In one embodiment, the search for optimum capacity, C, is effectuated by linearly increasing the value of C, as shown in FIG. 5. Alternatively, a faster logarithmic search method may be used to facilitate the determination for the optimum capacity, C. To illustrate, if the initial value of C was set as 10,000 Kbps, and the initial value of C determined to be insufficient, the value of C may be exponentially increased to 20,000 Kbps, then to 40,000 kbps, and then to 80,000 Kbps and so forth, until a smallest upper bound (e.g., 40,000 Kbps) that satisfies the metrics, and a highest lower bound (e.g., 20,000 Kbps) that does not satisfy the metrics, are identified.

With the bounds available, the performance evaluation algorithm is run for a capacity, C, equal to the mid-point between the upper and lower bounds (i.e., 30,000 Kbps, for the example quoted). If the metrics are satisfied at the mid-point, then the mid-point becomes a new upper bound and the lower bound is maintained at its previous value. Otherwise the mid-point becomes a new lower bound and the upper bound is maintained at its previous value. Now the procedure is repeated using the new pair of lower and upper bounds. The ensuing recursion is continued till the upper and lower bounds are within an acceptable margin of error, at which point the value of the upper bound is output as the optimal capacity C. As may be appreciated, this version of the search outer loop of the algorithm implementation involves a logarithmic number of steps, and would converge significantly faster than a linear implementation, shown for illustrative purposes in FIG. 5. Further details for performing the logarithmic search may be found with reference to co-pending U.S. patent application Ser. No. 12/655,236 filed on Dec. 23, 2009, which is incorporated by reference in its entirety.

From step 514, the method re-submits the input parameters with the updated value of C back into the queuing model block 506 and the method is repeated until QoSmet=true at step 512. At step 512, if the variable QoSmet=true, then the method 500 proceeds to step 520. At step 520, the method outputs C as the engineered capacity and the method 500 ends.

Figure 6:
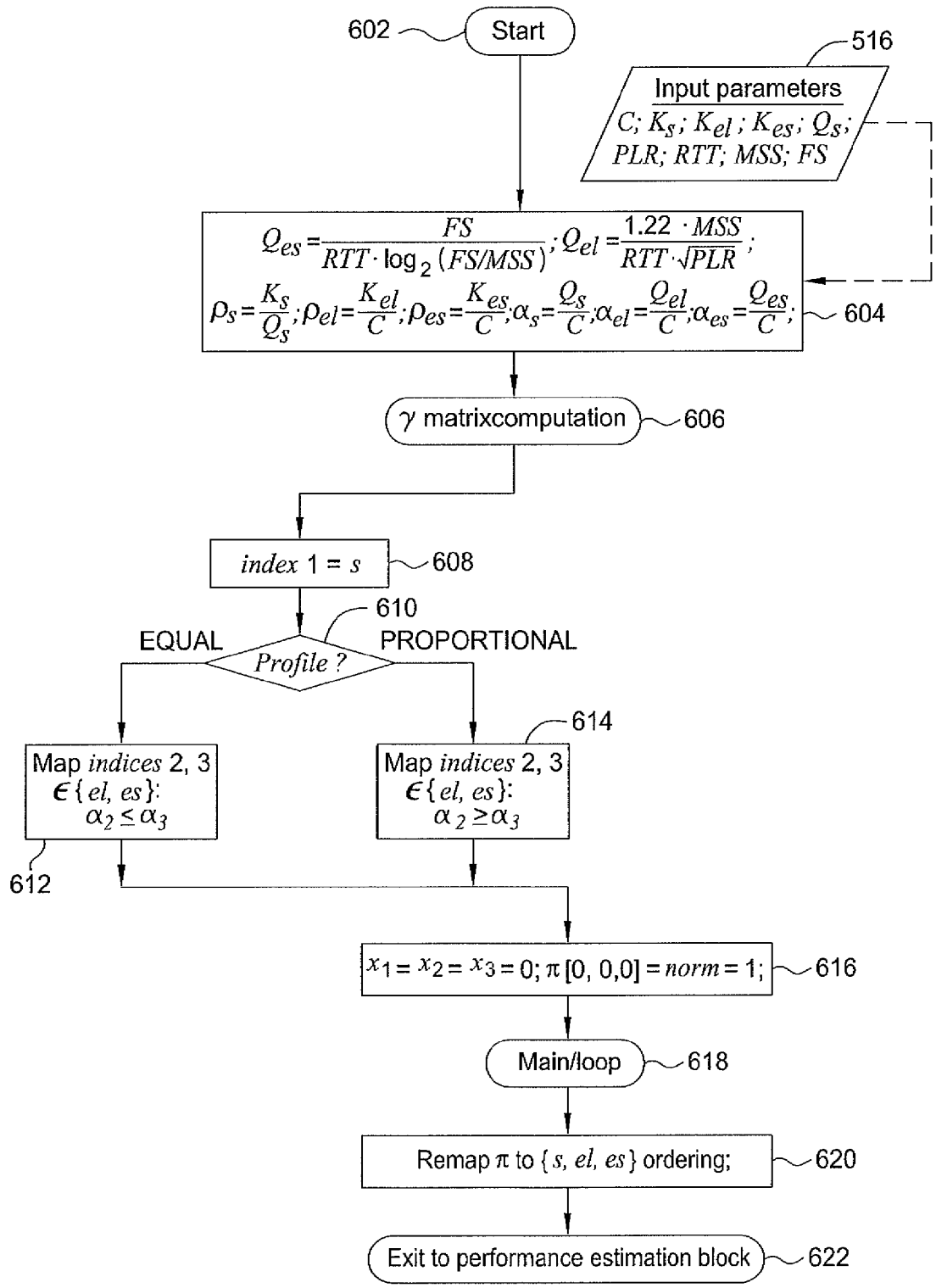
FIG. 6 illustrates a more detailed flowchart of a queuing model block.

FIG. 6 illustrates a more detailed flowchart of a method 600 that is one embodiment of a way to perform the queuing model block 506 illustrated in FIG. 5. It should be noted that the description of the algorithm captured in method 600 shown in FIG. 6, and further refined in methods 700-900 shown in FIGS. 7-9 below, approximate the infinite state space by a finite state space given by $\{[0,0,0], \ldots, [K,K,K]\}$, where K is chosen so as to achieve a desired level of numerical accuracy (e.g., K=100).

The method 600 starts at step 602 and proceeds to 604. At step 604, the method 600 receives the input parameters from block 516 as illustrated in FIG. 5. The input parameters are used to calculate various values, such as for example, $Q_{el}$, $Q_{es}$, $\rho_s$, $\rho_{el}$, $\rho_{es}$, $\alpha_s$, $\alpha_{el}$ and $\alpha_{es}$. The equations for calculating the values of $Q_{el}$, $Q_{es}$, $\alpha_s$, $\alpha_{el}$ and $\alpha_{es}$ are discussed above in Equations (5) and (7)-(10). The symbols $\rho_s$, $\rho_{el}$ and $\rho_{es}$, as defined earlier, represent a normalized stream session erlangs, a normalized long elastic session erlangs and a normalized short elastic session erlangs. The values for $\rho_s$, $\rho_{el}$ and $\rho_{es}$ may be alternatively calculated using the Equations (18)-(20) below:

$$\rho_s = \frac{K_s}{Q_s}, \quad \text{Eq. (18)}$$

$$\rho_{el} = \frac{K_{el}}{C}, \quad \text{Eq. (19)}$$

$$\rho_{es} = \frac{K_{es}}{C}, \quad \text{Eq. (20)}$$

Once the various normalized values are calculated, the method 600 proceeds to step 606 where a γ matrix computation is performed. As discussed above, γ represents a capacity assigned to a particular session. The γ matrix provides a matrix that describes the per-session capacity assigned to each of the particular types of sessions $\gamma_i(x)$, under the exhaustive set of states of the system $\{x\}$ (the system state being defined by a vector of the number of active sessions belonging to the distinct classes under consideration). It should be noted that the values of the γ matrix entries would depend on the particular bandwidth sharing profile specified.

The method 600 then proceeds to step 608, wherein the highest algorithmic priority, index value of 1, is assigned to the streaming data, s. It should be noted that this assignment does not imply any kind of traffic prioritization in the physical world. For example, absolute traffic-dependent priorities are feasible only in dedicated private networks, and not in the HTTP/TCP public internet scenario. Rather, the above assignment has meaning only in an algorithmic sense, and is a consequence of the ordering implied by Equation (12), in light of the property described above, whereby the departure rates of stream sessions are independent of congestion and hence independent of the number of active elastic sessions, while the departure rates of elastic sessions (long, as well as short) do depend on congestion, hence on the occupancy levels of all classes.

At step 610, the method 600 then determines which bandwidth sharing profile was applied. For example, referring back to FIG. 5, at step 518, a bandwidth sharing profile was selected and entered into the queuing model block 506. If the equal bandwidth sharing profile was selected, then the method 600 proceeds to step 612. At step 612, the method 600 maps indices 2 and 3 to the long elastic data and the short elastic data according to the mathematical expression "Map indices 2, 3 $\in \{el,es\}:\alpha_2 \leq \alpha_3$." In other words, under the equal bandwidth sharing profile, the indices for the two elastic sub-classes are assigned in the order of increasing peak rates, which is the appropriate ordering to satisfy Equation (12) in this context.

However, if the proportional bandwidth sharing profile was selected, then the method 600 proceeds to step 614. At step 614, the method 600 maps indices 2 and 3 to the long elastic data and the short elastic data according to the mathematical expression "Map indices 2, 3 $\in \{el,es\}:\alpha_2 \geq \alpha_3$." In other words, under the proportional bandwidth sharing profile, the indices for the two elastic sub-classes are assigned in the order of decreasing peak rates, which is the appropriate ordering to satisfy Equation (12) in this context.

At step 616, the method 600 initializes each state variable $x_i$, for i=1-3, to 0 and the initial weight associated with state [0 0 0], π[0,0,0], to 1. Mathematically, this is expressed as shown in step 616 and below in Equation (21):

$$x_1 = x_2 = x_3 = 0; \pi[0,0,0] = \text{norm} = 1; \quad \text{Eq. (21)}$$

The method 600 then proceeds to step 618 where the main loop is performed. In one embodiment, the main loop calculates the steady state probabilities for each state within the bounds of the pessimistic weight function or optimistic weight function, as discussed earlier. The details of the main loop are described further below with reference to FIG. 8, in the context of conservative bounds; as will be explained, the sequence of certain operations therein may be reversed to arrive at optimistic bounds instead.

At step 620, the method 600 remaps the steady state distribution, π, in accordance with the original ordering of the streaming data, the long elastic data and the short elastic data. The method 600 then proceeds to step 622, where the method 600 exits at step 622 back to the performance estimation block 508, illustrated in FIG. 5.

Figure 7:
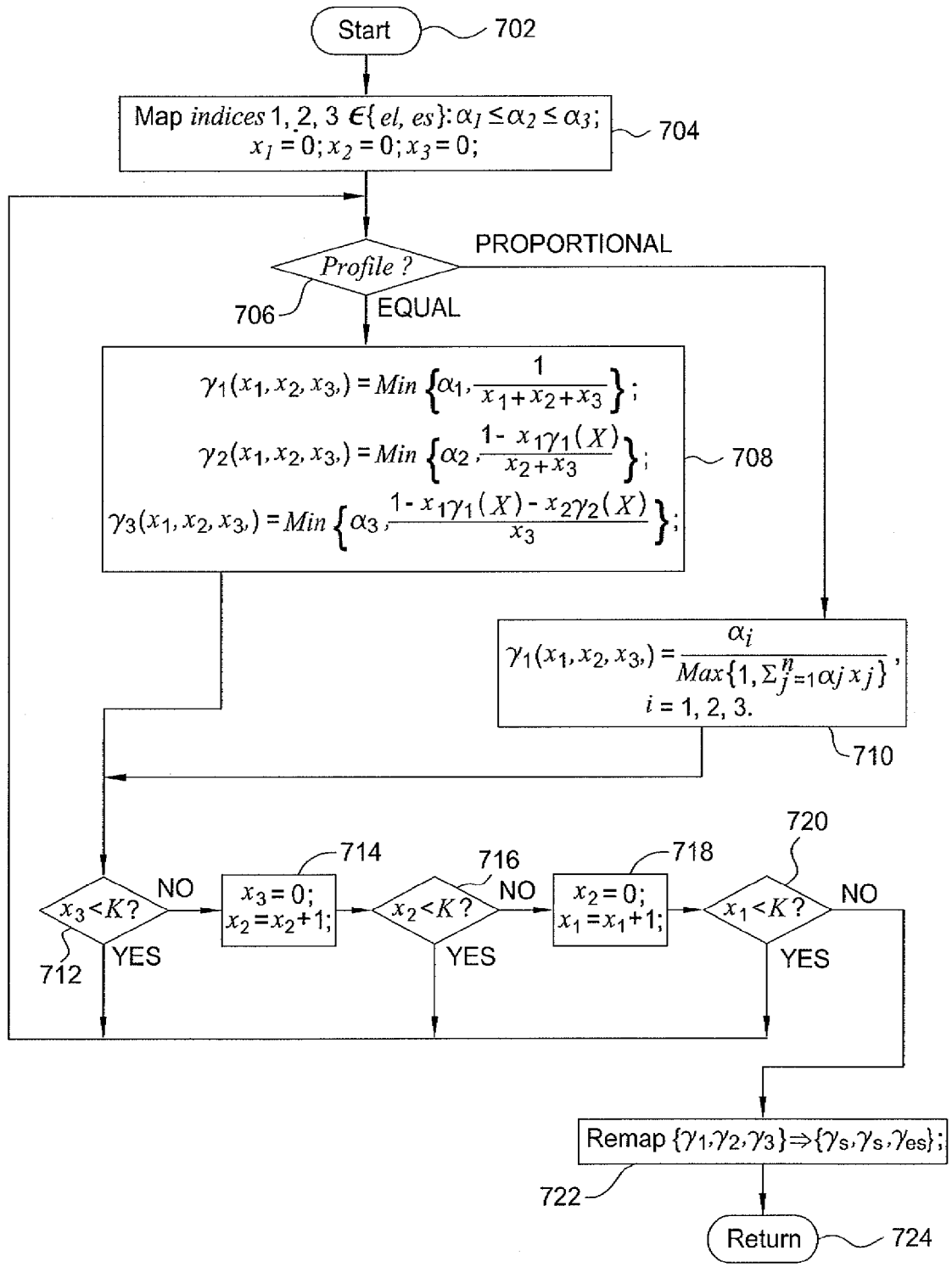
FIG. 7 illustrates a more detailed flowchart of a y matrix computation.

FIG. 7 illustrates a more detailed flowchart of a method 700 for the γ matrix computation 606 illustrated in FIG. 6. In one embodiment, the γ matrix provides information as to how bandwidth is being shared by the active session belonging to competing data types (e.g., stream session data sessions, long elastic data sessions and short elastic data sessions) for each state of the state transition diagram. The method 700 starts at step 702 and then proceeds to step 704. At step 704, the method 700 indexes the three traffic types in order of increasing peak rates as shown, and initializes the values for the γ matrix. The computation begins at state $\{0,0,0\}$ for $x_1$, $x_2$ and $x_3$. Mathematically, it is shown in step 704 and below in Equation (22):

$$\text{Map indices 1, 2, 3} \in \{s,el,es\}:\alpha_1 \leq \alpha_2 \leq \alpha_3;$$
$$x_1 = x_2 = x_3 = 0; \quad \text{Eq. (22)}$$

The method 700 then proceeds to step 706, where the method 700 determines which bandwidth sharing profile was selected. Again, referring back to FIG. 5, a bandwidth sharing profile was selected in step 518. Depending on the bandwidth sharing profile selected, the method 700 proceeds to step 708 or to step 710. If the equal bandwidth sharing profile was selected, the method 700 at step 708 calculates the y matrix according to Equation (2) provided above for $\gamma_1\{x_1, x_2, x_3\}$ and $\gamma_2\{x_1, x_2, x_3\}$ and $\gamma_3\{x_1, x_2, x_3\}$. However, if the proportional bandwidth sharing profile was selected, the method 700 at step 710 calculates the γ matrix according to Equation (11) above for i=1, 2, 3.

The method 700 then proceeds through each state of the state transition diagram until the bandwidth share for each state is calculated in the γ matrix as shown by steps 712, 714, 716, 718 and 720. Again, as mentioned earlier, K, is the maximum occupancy level of each class considered (i.e., the approximation of the infinite state-space by a finite one). In other words, steps 712-720 represent mathematically steps for ensuring that all the states are visited. In this case, for example, in the order [0,0,0], [1,0,0], . . . [K,0,0], [0,1,0], . . . [0,0,K], . . . [K,K,K].

Once the γ matrix is computed, the method 700 proceeds to step 722 where the bandwidth shares for each index are remapped to the traffic classes. For example, the $\gamma_1$ may be mapped to $\gamma_s$, the $\gamma_2$ may be mapped to $\gamma_{el}$ and the $\gamma_3$ may be mapped to $\gamma_{es}$ (if $\alpha_1 \le \alpha_2 \le \alpha_3$). The method 700 ends at 724 and returns to step 606 of FIG. 6.

Figure 8:
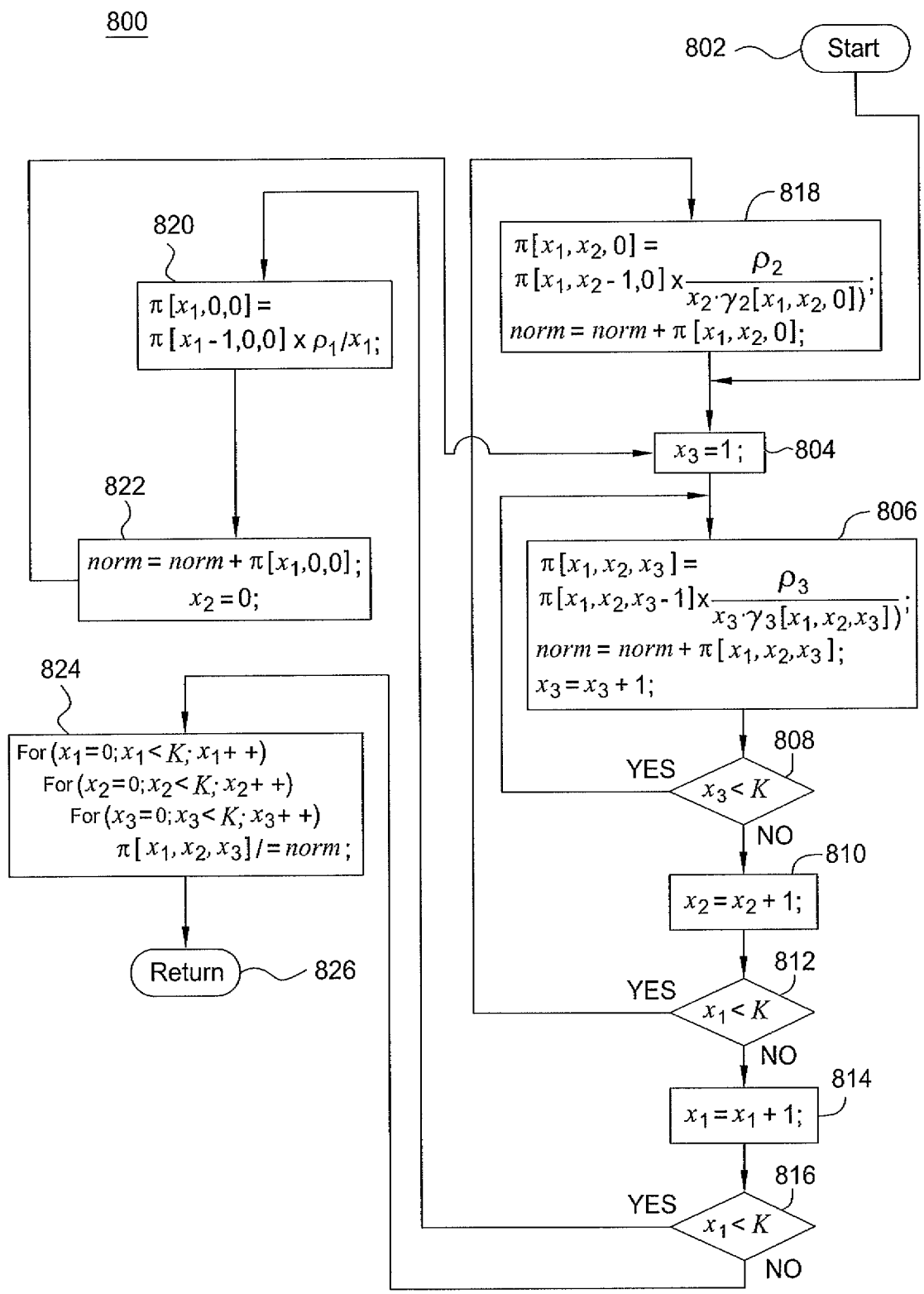
FIG. 8 illustrates a more detailed flowchart of a main loop.

FIG. 8 illustrates a more detailed flowchart of a method 800 for performing the main loop step 618 of FIG. 6. FIG. 8 illustrates one embodiment that applies the pessimistic weight function, $\check{\Psi}$, discussed above. With that objective, method 800 goes through the heaviest weight path starting with $x_3$, then $x_2$ and $x_1$, as shown. It should be noted that if the optimistic weight function, $\hat{\Psi}$, were to be used then the method 800 may be modified to go through the lightest weight path starting with $x_1$ to $x_3$. The probability variables π[0,0,0] . . . π[K,K,K] are initially used to compute and store the weight functions $\check{\Psi}[0,0,0]$ . . . $\check{\Psi}[K,K,K]$; subsequently, a normalization step is applied to convert them to probabilities. In particular π[0,0,0]=$\check{\Psi}$[0,0,0] was initialized to 1 in step 616 prior to the invocation of method 800.

The method 800 starts at step 802 and then proceeds to step 804. At step 804, the method 800 sets $x_3=1$ and starts calculating the steady state probabilities via the heaviest weight path. The method 800 proceeds to step 806.

Step 806 along with the loop test in step 808 executes Equation (13A) in conjunction with the associated efficient implementation, for the highest index 3. In particular, $\check{\Psi}$[0,0,1] through $\check{\Psi}$[0,0,K] are computed in the first pass.

Next, $x_2$ is incremented to 1 in step 810, determines if $x_1$ is less than K at step 812 and the method 800 proceeds to step 816 where $\check{\Psi}$[0,1,0] is computed via the logic of Equation (13A).

Next, $x_3$ is reset to 1 in step 804 and the algorithm returns to step 806 to compute $\check{\Psi}$[0,1,1] through $\check{\Psi}$[0,1,K] . This circuit involving steps 806, 808, 810, 812, 818 and 804 continues until $\check{\Psi}$[0,0,1] through $\check{\Psi}$[0,K,K] are generated.

At this point, the method 800 proceeds to step 814 and increments $x_1$ to 1. At step 816 if the test passes (i.e., $x_1<K$ is yes), the method 800 proceeds to step 820 where $\check{\Psi}$[1,0,0] is computed. The distinctions between the departure rates (φ's) for stream and elastic as described above, may be noted by comparing the calculation in step 820 (for stream) against that in step 806 or 818 (for elastic classes). The method 800 proceeds to step 822 where the variable norm is computed and $x_2$ is reset to 0. It should be noted that the variable norm may be continually updated upon computation of the weight for each and every state in steps 806, 818, 822 and 822.

Next the method 800 proceeds to step 804 where $x_3$ is reset to 1, following which $\check{\Psi}$[1,0,1] is computed in step 806, The circuit involving steps 806, 808, 810, 812, 818 and 804 is invoked a second time until $\check{\Psi}$[1,0,1] through $\check{\Psi}$[1,K,K] are generated.

At this point, method 800 again proceeds to step 814 to increment $x_1$. It may thus be appreciated that the macro circuit involving steps 806, 808, 810, 812, 814, 816, 818, 804, 820 and 822 eventually generates all of $\check{\Psi}$[0,0,1] through $\check{\Psi}$[K,K,K], at which point the test fails in step 816 (i.e. $x_1<K$ is no) bringing method 800 to step 824. As may be noticed, the value of the normalization variable norm at this point equals the sum of the weight function values for all the system states (the infinite state-space being approximated as $K^3$ finite states). In step 824, the weight function value for each state is divided by norm to convert to the corresponding state probability. The method 800 then proceeds to step 826 where the method 800 ends and returns to step 618 of FIG. 6.

It is again noted that in a different embodiment, the optimistic probability bounds may be computed instead of the pessimistic bounds simply by reversing the order of the indices. For example, by using $x_1$ in place of $x_3$ in steps 804, 806 and 808 and $x_3$ in the place of $x_1$ in steps 814, 816 and 820, the computation sequence can be changed to generate the optimistic weight functions {$\hat{\Psi}$[0,0,0] . . . $\hat{\Psi}$[K,K,K]} instead of the pessimistic weight functions as is being accomplished in FIG. 8 with the order shown.

Figure 9:
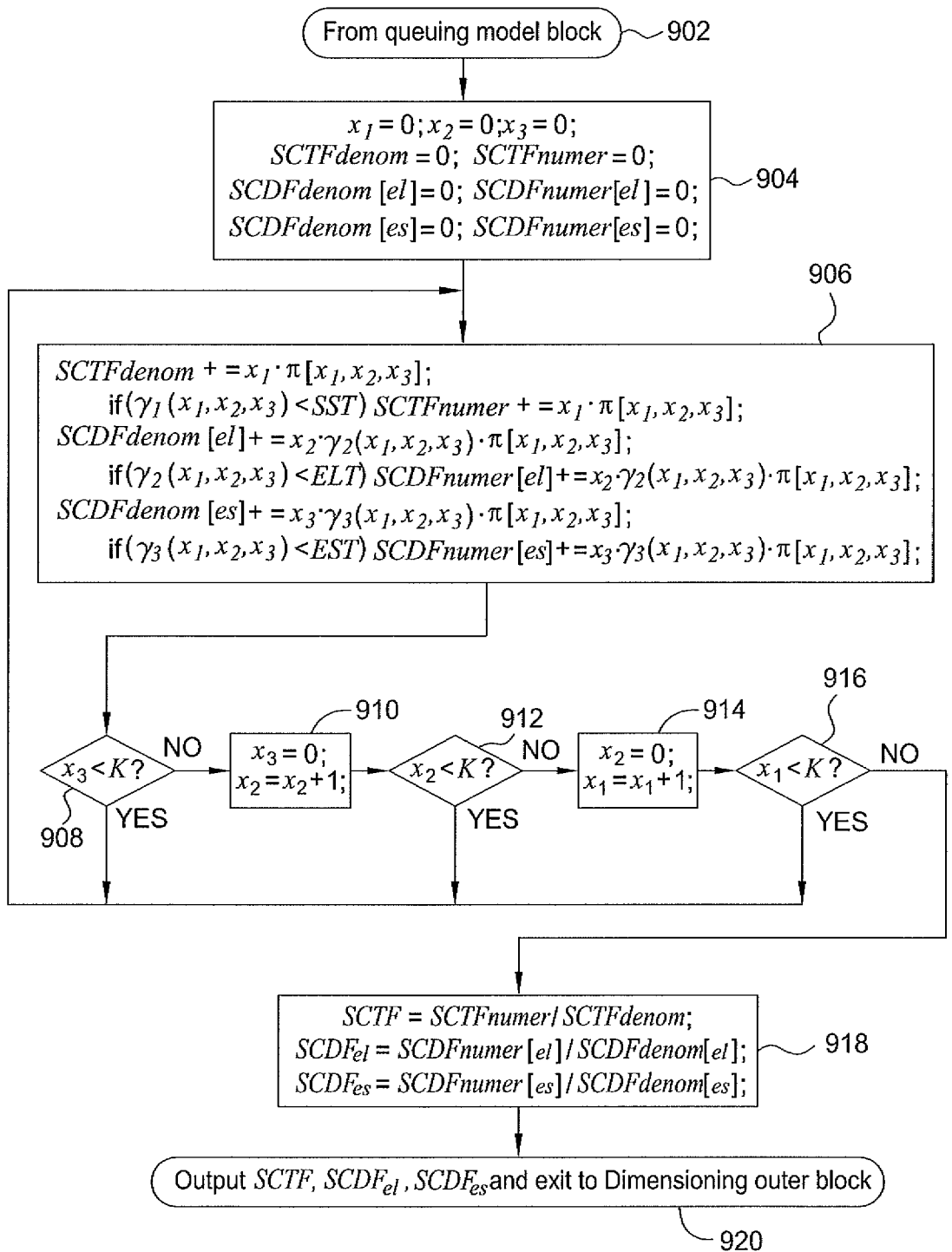
FIG. 9 illustrates a more detailed flowchart of a performance estimation block.

FIG. 9 illustrates a more detailed flowchart of a method 900 for performing the performance estimation block step 508 of FIG. 5. The method 900 starts at step 902 from the queuing model block 506 of FIG. 5 and proceeds to step 904. At step 904, the method 900 initializes values to begin calculation of the performance metric parameters SCTF, $SCDF_{el}$ and $SCDF_{es}$. For example, $x_1$, $x_2$ and $x_3$ are set to 0. In addition, the parameters SCTFdenom, SCTF numer, SCDFdenom[el], SCDFnumer[el], SCDFdenom[es] and SCDFnumer[es] are also set to 0. The parameters SCTF numer, SCDFnumer[el] and SCDFnumer[es] represent the numerator value (e.g., the numerator of Equations (16) and (17)) for calculating the performance metric parameters SCTF, $SCDF_{el}$ and $SCDF_{es}$, respectively. The parameters SCTFdenom, SCDFdenom[el] and SCDFdenom[es] represent the denominator value (e.g., the denominator of Equations (16) and (17)) for calculating the performance metric parameters SCTF, $SCDF_{el}$ and $SCDF_{es}$, respectively.

The method 900 then proceeds to step 906. The method 900 at step 906 calculates the parameters SCTFdenom, SCTF numer, SCDFdenom[el], SCDFnumer[el], SCDFdenom[es] and SCDFnumer[es] for each state. For example, the calculation is defined by Equations (16) and (17) described above. Step 906 illustrates another way of expressing what is shown in Equations (16) and (17) described above. It should be noted that the mathematical expression "A+=B" is shorthand representation for the mathematical expression "A=A+B".

The method 900 proceeds through each state as shown by steps 908, 910, 912, 914 and 916 until the final values of the parameters SCTFdenom, SCTF numer, SCDFdenom[el], SCDFnumer[el], SCDFdenom[es] and SCDFnumer[es] are calculated. In other words, steps 908-916 represent mathematically steps for ensuring that all the states are visited. In this case, for example, in the order [0,0,0], [1,0,0], . . . [K,0,0], [0,1,0], . . . [0,0,K], . . . [K,K,K].

At step 918, the values of the performance metric parameters SCTF, $SCDF_{el}$ and $SCDF_{es}$ are calculated using the final values of the parameters SCTFdenom, SCTF numer, SCDFdenom[el], SCDFnumer[el], SCDFdenom[es] and SCDFnumer[es]. The method 900 proceeds to step 920 where the values of SCTF, $SCDF_{el}$ and $SCDF_{es}$ are outputted to step 510 of FIG. 5.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 3 and 9 that recite a determining operation, or involve a decision, do not necessarily require that both branches of the determining operation be practiced.

In other words, one of the branches of the determining operation can be deemed as an optional step.

Figure 10:
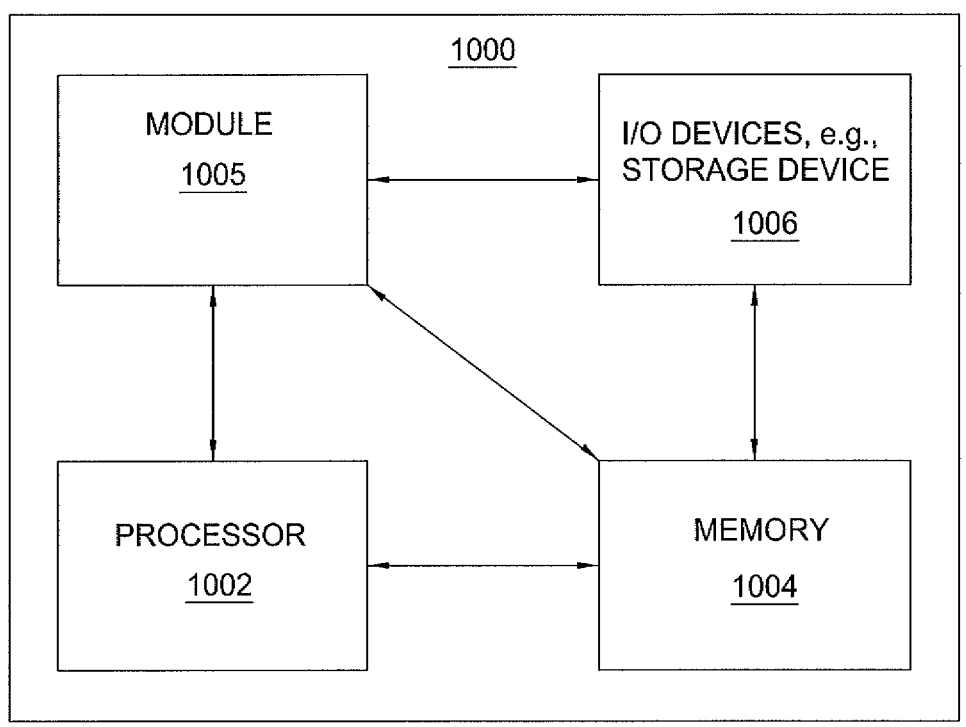
FIG. 10 illustrates a high-level block diagram of a general-purpose computer suitable for use in performing the functions described herein.

FIG. 10 depicts a high-level block diagram of a general-purpose computer suitable for use in performing the functions described herein. As depicted in FIG. 10, the system 1000 comprises a processor element 1002 (e.g., a CPU), a memory 1004, e.g., random access memory (RAM) and/or read only memory (ROM), a module 1005 for calculating a capacity for high speed packet access data in a link in a communications network, and various input/output devices 1006 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 1005 for calculating a capacity for high speed packet access data in a link in a communications network can be loaded into memory 1004 and executed by processor 1002 to implement the functions as discussed above. As such, the present method 1005 for calculating a capacity for high speed packet access data in a link in a communications network (including associated data structures) of the present disclosure can be stored on a non-transitory (tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for calculating a capacity for high speed packet access data in a link in a communications network, comprising:
   initializing, by a processor, parameters associated with streaming data, long elastic data and short elastic data;
   determining, by the processor, a capacity value where a quality of service metric is met for the streaming data, the long elastic data and the short elastic data, wherein the determining comprises:
      determining an ordering of priority for the streaming data, the long elastic data and the short elastic data;
      calculating a sub-par customer time fraction for the streaming data, a long elastic sub-par customer data fraction and a short elastic sub-par customer data fraction based upon the ordering of priority; and
      determining if the sub-par customer time fraction is greater than or equal to a target sub-par customer time fraction, if the long elastic sub-par customer data fraction is greater than or equal to a target long elastic sub-par customer data fraction, and if the short elastic sub-par customer data fraction is greater than or equal to a target short elastic sub-par customer data fraction; and
   provisioning, by the processor, the link with the capacity value if the quality of service metric is met.

2. The method of claim 1, wherein the streaming data, the long elastic data and the short elastic data employ a transmission control protocol.

3. The method of claim 1, wherein the parameters comprise an initial capacity value, an aggregate busy hour data traffic intensity for the streaming data, the long elastic data and the short elastic data, a peak rate of the streaming data, a packet loss probability for the long elastic data and the short elastic data, a round trip delay time for the long elastic data and the short elastic data, a maximum transmission control protocol segment size and a representative file size for the short elastic data.

4. The method of claim 1, wherein the determining the ordering of priority comprises:
   calculating a bandwidth share matrix based upon a bandwidth sharing profile;
   initializing an ordering of priority to provide an initial ordering of priority;
   calculating a bound based upon the bandwidth share matrix and the initial ordering of priority based upon the bandwidth sharing profile; and
   remapping the order of priority based upon the bound.

5. The method of claim 4, wherein the bandwidth sharing profile comprises an equal bandwidth sharing profile or a peak rate proportional bandwidth sharing profile.

6. The method of claim 4, wherein the bound comprises a pessimistic bound that follows a heaviest weight path.

7. The method of claim 4, wherein the bound comprises an optimistic bound that follows a lightest weight path.

8. The method of claim 4, wherein the streaming data is mapped as a highest priority.

9. The method of claim 1, further comprising:
   increasing an initial capacity value if the quality of service metric is not met;
   determining if the quality of service metric is met with an increased capacity value; and
   repeating the increasing and the determining if the quality of service metric is not met with the increased capacity value until the quality of service metric is met and the capacity value is determined.

10. The method of claim 1, wherein the link is an IuB interface of a universal mobile telecommunications system.

11. The method of claim 1, wherein the link is an S1 interface of a long term evolution communication network.

12. A non-transitory computer-readable medium storing a plurality of instructions which, when executed by a processor, cause the processor to perform operations for calculating a capacity for high speed packet access data in a link in a communications network, the operations comprising:
   initializing parameters associated with streaming data, long elastic data and short elastic data;
   determining a capacity value where a quality of service metric is met for the streaming data, the long elastic data and the short elastic data, wherein the determining comprises:
      determining an ordering of priority for the streaming data, the long elastic data and the short elastic data;
      calculating a sub-par customer time fraction for the streaming data, a long elastic sub-par customer data fraction and a short elastic sub-par customer data fraction based upon the ordering of priority; and
      determining if the sub-par customer time fraction is greater than or equal to a target sub-par customer time fraction, if the long elastic sub-par customer data fraction is greater than or equal to a target long elastic sub-par customer data fraction, and if the short elastic sub-par customer data fraction is greater than or equal to a target short elastic sub-par customer data fraction; and provisioning the link with the capacity value if the quality of service metric is met.

13. The non-transitory computer readable medium of claim 12, wherein the determining the ordering of priority comprises:
- calculating a bandwidth share matrix based upon a bandwidth sharing profile;
- initializing an ordering of priority to provide an initial ordering of priority; and
- calculating a bound based upon the bandwidth share matrix and the initial ordering of priority based upon the bandwidth sharing profile;
- remapping the order of priority based upon the bound.

14. The non-transitory computer readable medium of claim 13, wherein the bandwidth sharing profile comprises an equal bandwidth sharing profile or a peak rate proportional bandwidth sharing profile.

15. The non-transitory computer readable medium of claim 13, wherein the bound comprises a pessimistic bound that follows a heaviest weight path.

16. The non-transitory computer readable medium of claim 13, wherein the bound comprises an optimistic bound that follows a lightest weight path.

17. The non-transitory computer readable medium of claim 12, further comprising:
- increasing an initial capacity value if the quality of service metric is not met;
- determining if the quality of service metric is met with an increased capacity value; and
- repeating the increasing and the determining if the quality of service metric is not met with the increased capacity value until the quality of service metric is met and the capacity value is determined.

18. An apparatus for calculating a capacity for high speed packet access data in a link in a communications network, comprising:
- a processor; and
- a computer readable medium storing a plurality of instructions which, when executed by the processor, cause the processor to perform operations, the operations comprising:
  - initializing parameters associated with streaming data, long elastic data and short elastic data;
  - determining a capacity value where a quality of service metric is met for the streaming data, the long elastic data and the short elastic data, wherein the determining comprises:
    - determining an ordering of priority for the streaming data, the long elastic data and the short elastic data;
    - calculating a sub-par customer time fraction for the streaming data, a long elastic sub-par customer data fraction and a short elastic sub-par customer data fraction based upon the ordering of priority; and
    - determining if the sub-par customer time fraction is greater than or equal to a target sub-par customer time fraction, if the long elastic sub-par customer data fraction is greater than or equal to a target long elastic sub-par customer data fraction, and if the short elastic sub-par customer data fraction is greater than or equal to a target short elastic sub-par customer data fraction; and
  - provisioning the link with the capacity value if the quality of service metric is met.

19. The apparatus of claim 18, wherein the determining the ordering of priority comprises:
- calculating a bandwidth share matrix based upon a bandwidth sharing profile;
- initializing an ordering of priority to provide an initial ordering of priority; and
- calculating a bound based upon the bandwidth share matrix and the initial ordering of priority based upon the bandwidth sharing profile;
- remapping the order of priority based upon the bound.

20. The apparatus of claim 19, wherein the bandwidth sharing profile comprises an equal bandwidth sharing profile or a peak rate proportional bandwidth sharing profile.

* * * * *